United States Patent
Fox, III

(10) Patent No.: US 8,246,011 B1
(45) Date of Patent: Aug. 21, 2012

(54) SLIDABLE ADJUSTABLE JACKING DEVICE

(76) Inventor: Elmer C. Fox, III, Brandon, MS (US)

( * ) Notice: Subject to any disclaimer, the term of this patent is extended or adjusted under 35 U.S.C. 154(b) by 434 days.

(21) Appl. No.: 12/660,472

(22) Filed: Feb. 26, 2010

(51) Int. Cl.
*B60S 9/02* (2006.01)

(52) U.S. Cl. ......... 254/420; 254/418; 254/424; 254/425

(58) Field of Classification Search .................. 254/420, 254/418, 424, 425
See application file for complete search history.

(56) References Cited

U.S. PATENT DOCUMENTS

| | | | |
|---|---|---|---|
| 964,394 | A | 7/1909 | Coddington |
| 1,505,443 | A | 8/1924 | Stone |
| 2,852,229 | A | 9/1958 | Gross |
| 2,970,810 | A | 2/1961 | Zich et al. |
| 3,275,298 | A | 9/1966 | Hand |
| 3,595,527 | A * | 7/1971 | Douglass ...................... 254/420 |
| 3,851,855 | A * | 12/1974 | Douglass ...................... 254/420 |
| 4,066,243 | A | 1/1978 | Johnson |
| 4,068,826 | A | 1/1978 | Scott |
| 4,176,824 | A | 12/1979 | Linton et al. |
| 4,238,113 | A | 12/1980 | Adams |
| 4,316,601 | A | 2/1982 | Osborne et al. |
| 4,624,447 | A | 11/1986 | Richmeier |
| 4,842,252 | A | 6/1989 | McMahan |
| 5,174,550 | A * | 12/1992 | Pittman ........................ 254/420 |

FOREIGN PATENT DOCUMENTS

GB 1153759 5/1969

OTHER PUBLICATIONS

Square Tube Jacks, <http://www.shelbyindustries.com/Trailer-Jacks/p-52-Square-Tube-Jacks.html> (accessed Feb. 6, 2010).
Using the Hi-Lift Jack, <http://www.offroadadventures.com/articles/view/id/347/page/1> (accessed Dec. 8, 2009).

* cited by examiner

*Primary Examiner* — Monica Carter
*Assistant Examiner* — Nirvana Deonauth
(74) *Attorney, Agent, or Firm* — Francis P. Lipinski, Esq.

(57) ABSTRACT

A slidable adjustable jacking device where the numbers of rotations of a hand crank on a jacking device may be greatly reduced by using a slidable screwjack inner member to reposition a load-carrying member. New in the art is the use of a slidable screwjack inner member and an affixed bar within a tubular outer member and an affixed passageway. This invention re-positions a slidable screwjack inner member to a location and then pins the member such that the member is fixed relative to a trailer. The device is useful for raising or lowering the tongue of a trailer.

8 Claims, 3 Drawing Sheets

US 8,246,011 B1

SLIDABLE ADJUSTABLE JACKING DEVICE

CROSS-REFERENCE TO RELATED APPLICATIONS

Not Applicable

FEDERALLY SPONSORED RESEARCH

Not Applicable

SEQUENCE LISTING OR-PROGRAM

Not applicable

BACKGROUND

1. Field of Invention

This present invention relates to implements or apparatus for applying pushing or pulling force, specifically to a slidable adjustable screwjack inner member for a lifting jack. Particularly, this present invention relates to a slidable adjustable jacking device mounted on a tongue of a trailer. More particularly, this invention improves the ability to reduce the number of times a hand crank must be rotated to extend a load-carrying member. This device allows a screwjack inner member to be slid inside a tubular outer member and then pinned in a fixed position.

2. Prior Art

There are times when a lifting jack must have a hand crank rotated many times to extend a load-carrying member so that the member or leg makes contact with the ground to transfer weight. Likewise, upon retracting certain lifting jacks, a hand crank of the jackscrew in the lifting jack must be rotated many times. There have been various attempts to extend or retract the load-carrying member of the lifting jack so that the amount of time and the number of times the hand crank has to be rotated is reduced.

In 1910, Erastus Coddington was awarded U.S. Pat. No. 964,394. This historical patent teaches a lifting jack with a slideable sleeve over a stem. A stem is adjustable and supported on a standard. A sleeve rotates in the stem. There are recesses in the sleeve to allow the stem to be adjustable according to vertical slots. The lifting jack height can be adjusted using slots. However, this device is limited to supporting the weight that rests on these small stems.

Israel Gross's U.S. Pat. No. 2,852,229 teaches lifting equipment for jack operations. This invention has a base and a vertically erect post. The post is provided, at spaced intervals, with diametrically extended perforations to permit adjustment of the position of the adjustable header. The adjustable header includes a tubular portion, which surrounds the post and connects with the header. The advantage of this construction is the considerable height obtainable in this assembly and heavy loads can be lifted by the application of a relatively small force at the jack. The disadvantage of this construction is that it is complicated because it uses a regular lifting jack and additional pieces. The pieces are not integral to the lifting jack and the setup is also complicated.

U.S. Pat. No. 3,275,298, Demountable Containers Provided With Jack Legs for Raising or Lowering the Same, was issued to Albert Hand in 1966. Hand relates to heavy-duty devices for raising, supporting and lowering heavy, bulky bodies, which are required to be moved between relatively low and relatively high elevations and to be supported at levels in between. The jack leg includes a reaction base that is vertically adjustable on the standard between a station adjacent to the foot and at least one station spaced above. To permit the adjustment there are holes in the standard. The holes are registerable (able to be aligned) between the standard and the reaction base using a pin. However, this device does not use the jack as the course alignment but rather a standard off to the side. The force must be channeled through a reaction base, creating a weak link in the transfer of the force vector.

In 1969, Burdette Douglass was awarded U.S. Pat. No. 3,595,527, Quickly Retractable and Extensible Jack Construction, which teaches a jack body that adjusts the load-carrying member that is slidable in the jack body. The Douglass patent uses L-shaped slots in the sleeve and radial projections on the jack body to elongate the jack and provide for rough adjustment in the length of the jack. After the rough adjustment is made, a screw arrangement is used to make fine jacking adjustments. But these L-shaped sleeves can only support so much weight. This weakness is similar to Coddington 964,394 because the much force must be transferred to relatively small 'dog ears' or stems.

Leroy Scott, in 1978, was granted a patent for "Heavy Duty Lifting Devices" in U.S. Pat. No. 4,068,826. Scott's invention teaches a plurality of engagement positions for the hydraulic piston rod to permit a greater extension of the load-carrying sleeve with respect to the base of the jack. This invention does not, however, uncomplicated the process of raising or lowering items.

In 1979, Francis Linton et al. were issued U.S. Pat. No. 4,176,824, Lifting Apparatus. This invention teaches a fixture made of two side-by-side plates and two bails fastened to a vehicle. The side-by-side plates are provided with two sets of aligned apertures through which pins may be inserted. This device is limited in nature because the bail fasteners are a point of weakness with regard to transferring forces from the thing being lifted to the area where the lifting apparatus transfers its weight.

U.S. Pat. No. 4,238,113, Jacking Device, was issued to Vernon Adams in 1980. Adams teaches a detached slideable column with a plurality of longitudinally spaced holes extending transversely through the column to provide for the rough adjustment of the column. But this device is comprised of an adjustable column that is not integral to the upright vertical housing and places strain on a rough adjusting column.

Dale McMahan's U.S. Pat. No. 4,842,252, Rapidly Extendable Jack, was issued in 1989. This invention teaches a rapidly expandable jack and a course adjustment mechanism using a pin and a hole arrangement with the pin protruding from the outer sleeve through the inner sleeve. But the pin that the invention uses will only support the weight that rest on a small portion of a pin.

Jerry Pittman's U.S. Pat. No. 5,174,550 is a complicated device that teaches a quick release and quick retract jack that features an outer wall of a tubular member that is deformed inwardly forming detents equally spaced along a significant portion of the length of the outer wall. These detents form spaced projections, which extend inwardly from the inner wall into the bore of the tubular member. The detents allow for positioning of the sleeve.

An Internet publication teaches using a "Hi-Lift' jack that uses pins to adjust the length of travel of a jacking device. But this device does not have a slidable sleeve to reduce the number of rotations.

An Internet publication teaches a square tube jack, but this jack is not slidable out either end of the outer tube. Shelby Industries makes a "8000 # Top Wind Sq Tube Jack, Weld-On, Drop Leg, Black," but the device, if welded onto a trailer would require an operator to reach below the trailer to remove or insert a pin to fix the leg length.

SUMMARY

The present invention is directed to a Class 254, Implements or Apparatus for Applying Pushing or Pulling Force, Subclass 134, Adjustable.

The present invention is an implement for applying a pushing force comprising a slidable adjustable screwjack inner member which reduces the number of rotations required by a hand crank to extend a load-carrying member.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

These and other features, aspects, and advantages of the present invention will become better understood with regard to the following description, appended claims, and accompanying drawings.

REFERENCE NUMERALS

Figure 1:
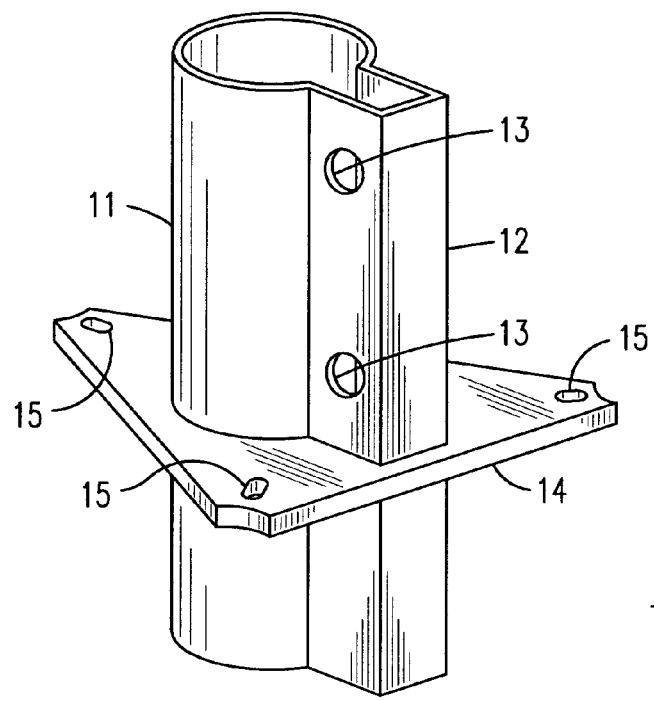
FIG. 1 shows a perspective of the device manufactured using round dimensions for a tubular outer member, including an affixed passageway, complementary passageway holes in the sides of a passageway, and a flange surrounding the tubular outer member and the affixed passageway.

10 Slidable adjustable jacking device
11 Tubular outer member
12 Passageway
13 Complementary passageway holes
14 Flange
15 Flange mounting opening
16 Bar hole
17 Hand crank
18 Pin
20 Screwjack inner member
21 Bar
22 Load-carrying member
23 Trailer
24 Foot
25 Jackscrew

DESCRIPTION

FIG. 1 is a view of a tubular outer member of a slidable, adjustable jacking device 10. The slidable adjustable jacking device 10 is tubular in nature, consisting of a round tubular outer member 11 with a passageway 12 attached axially to a wall of a round tubular outer member 11. The passageway 12 is rectangular in shape and has three walls. There are two parallel walls and an exterior wall. A flange 14 is welded to the exterior of a tubular outer member 11 and surrounds the round tubular outer member 11 and the passageway 12. If it is preferred, tubular outer member 11 and the passageway 12 may be forged as a single unit. A flange 14 is triangular in shape. There are flange mounting openings 15 in the flange 14 so it can be bolted to a trailer 23. There are three flange mounting openings 15; one flange mounting opening 15 in each corner of the flange 14. The area formed by the round tubular outer member 11 and the passageway 12 is designed to accept a screwjack inner member 20. There are complementary passageway holes 13 in sidewalls of the passageway 12 for accepting a pin 18.

Figure 5:
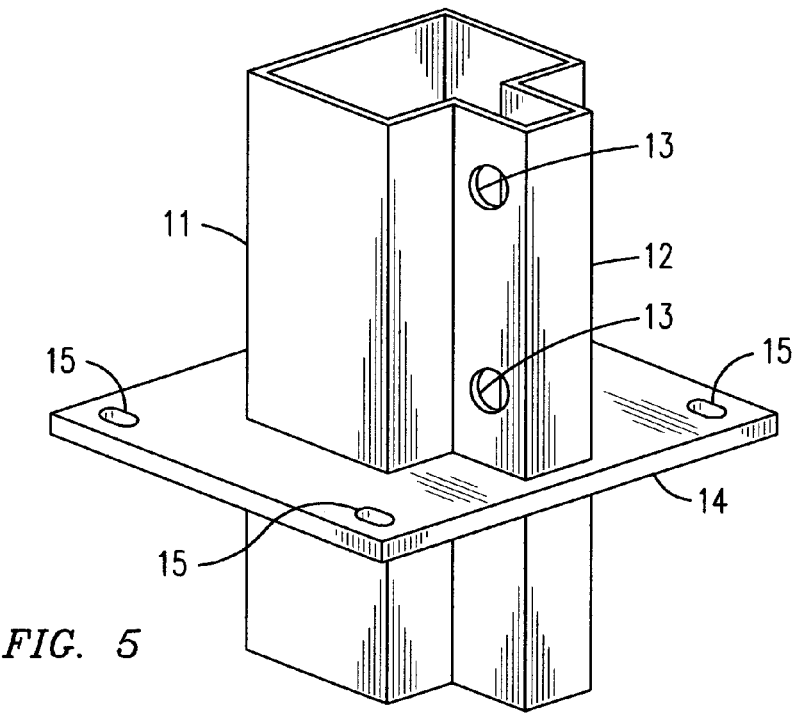
FIG. 5 shows a perspective of the device manufactured using square or rectangular dimensions for a tubular outer member, including an affixed passageway, complementary passageway holes in the sides of a passageway, and a flange surrounding a tubular outer member and an affixed passageway.

FIG. 5 is similar in nature to FIG. 1, except that it represents a rectangular version of the slidable adjustable jacking device 10. The flange 14 on a square or rectangular version of a slidable adjustable jacking device 10 is square or rectangular and includes an additional flange mounting opening 15; one flange mounting opening in each corner of the flange 14.

Figures 2, 3:
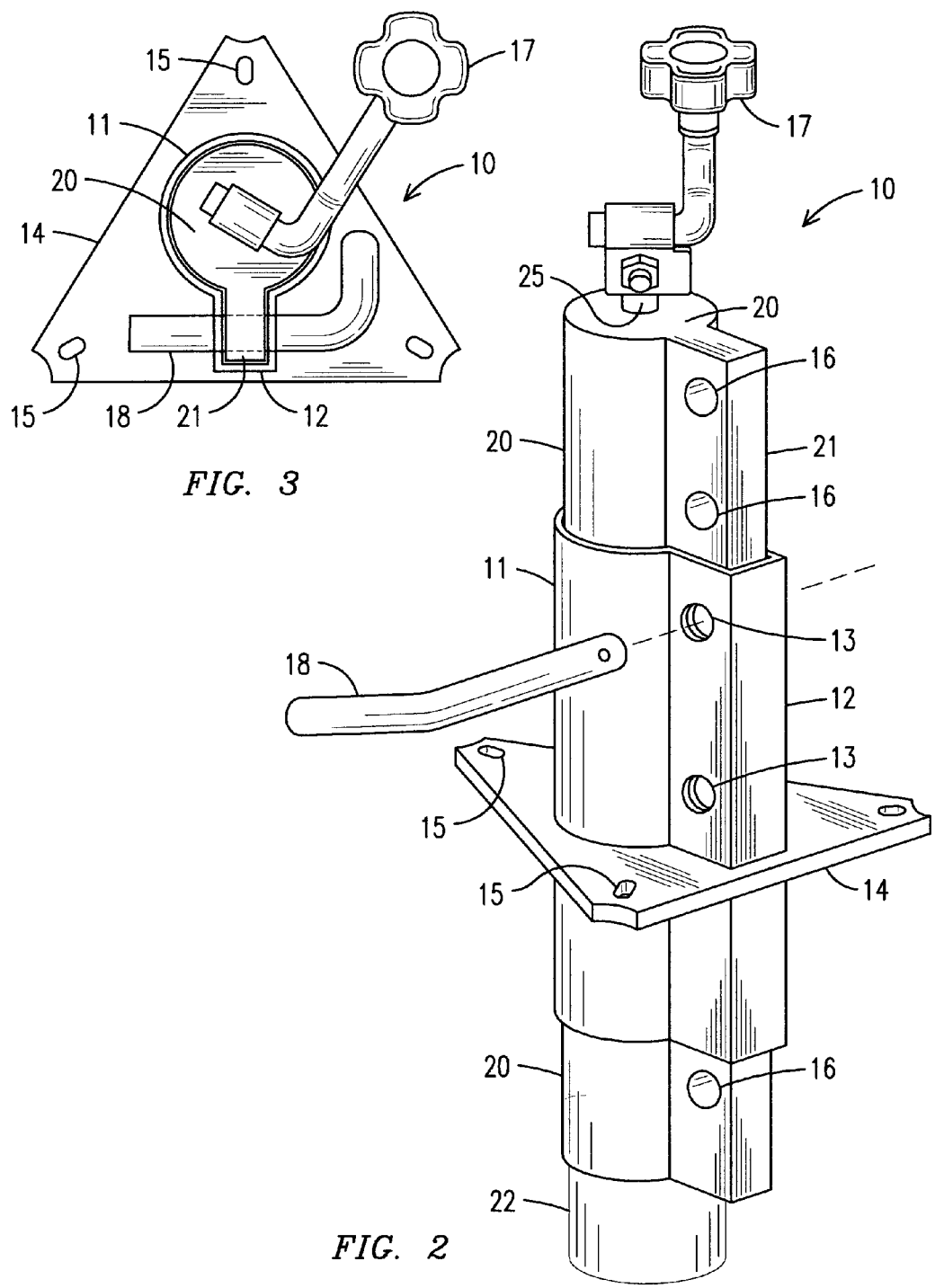
FIG. 2 shows a perspective of the device, including a tubular outer member and a passageway, a screwjack inner member with a bar that is affixed to a screwjack inner member and that slides in a passageway, a load-carrying member on the bottom of the invention, a hand crank on the top of the invention, complementary passageway holes, bar holes, and a pin.
FIG. 3 shows a top view of the device, including a pin in a pinned arrangement, flange mounting openings and a hand crank.

FIG. 2 represents a slidable adjustable jacking device 10. The figure depicts a tubular outer member 11 and a passageway 12 with a screwjack inner member 20 and a bar 21 installed inside the tubular outer member 11 and the passageway 12. A screwjack inner member 20 has a bar 21 affixed axially on its outside surface. A bar 21 may be welded axially to the screwjack inner member 20. As an alternative, a single piece may be forged as a solid unit made up of a combination of bar 21 and screwjack inner member 20. The bar 21 has bar holes 16 drilled transversely at equally distant locations along the length of the bar 21. These bar holes 16 are the same distance apart as the complementary passageway holes 13 so that when the complementary passageway holes 13 and the bar holes 16 are registered together in alignment, a pin 18 can be inserted through and a slidable adjusting jacking device 10 can be locked in a fixed extended or fixed retracted position. A process of sliding the screwjack inner member 20 and the affixed bar 21, provides the course adjustment for the jacking operation. Once the complementary passageway holes 13 and the bar holes 16 are registered together, and a pin 18 is inserted through a registered complementary passageway holes 13 and a bar hole 16, a jacking device is in a fixed position. This previously stated action is the course adjustment of a slidable adjustable jacking device 10. Then, a hand crank 17 is rotated for fine adjustment of a load-carrying member 22. This action of rotating hand crank 17 rotates the jackscrew 25 and extends or retracts the load-carrying member 22. The slidable adjustable jacking device 10 is mounted onto a trailer 23 using a flange 14 which rests on the top of a trailer surface. Flange mounting openings 15 are utilized to affix a flange 14 to a trailer 23.

FIG. 3 show a slidable adjustable jacking device as viewed from the top. When a bar hole 16, located in bar 21 are in alignment with a complementary passageway holes 13 located in a passageway 12, then a pin 18 fixes a passageway 12 and a bar 21 in a fixed position. Then a hand crank 17, which is connected to a screwjack inner member 20, is rotated to extend or retract a load-carrying member 22. Load-carrying member 22 and foot 24 may be raised to a full, retracted position to prevent the load-carrying member 22 and the foot 24 from being damaged. FIG. 3 also identifies the location of flange mounting openings in the corners of a triangular shaped flange 14. If it is desired to use a square or rectangular shaped tubular outer member 11, then there will be an a flange mounting hole 15, in each corner of the square or rectangular flange 14.

Figure 4:
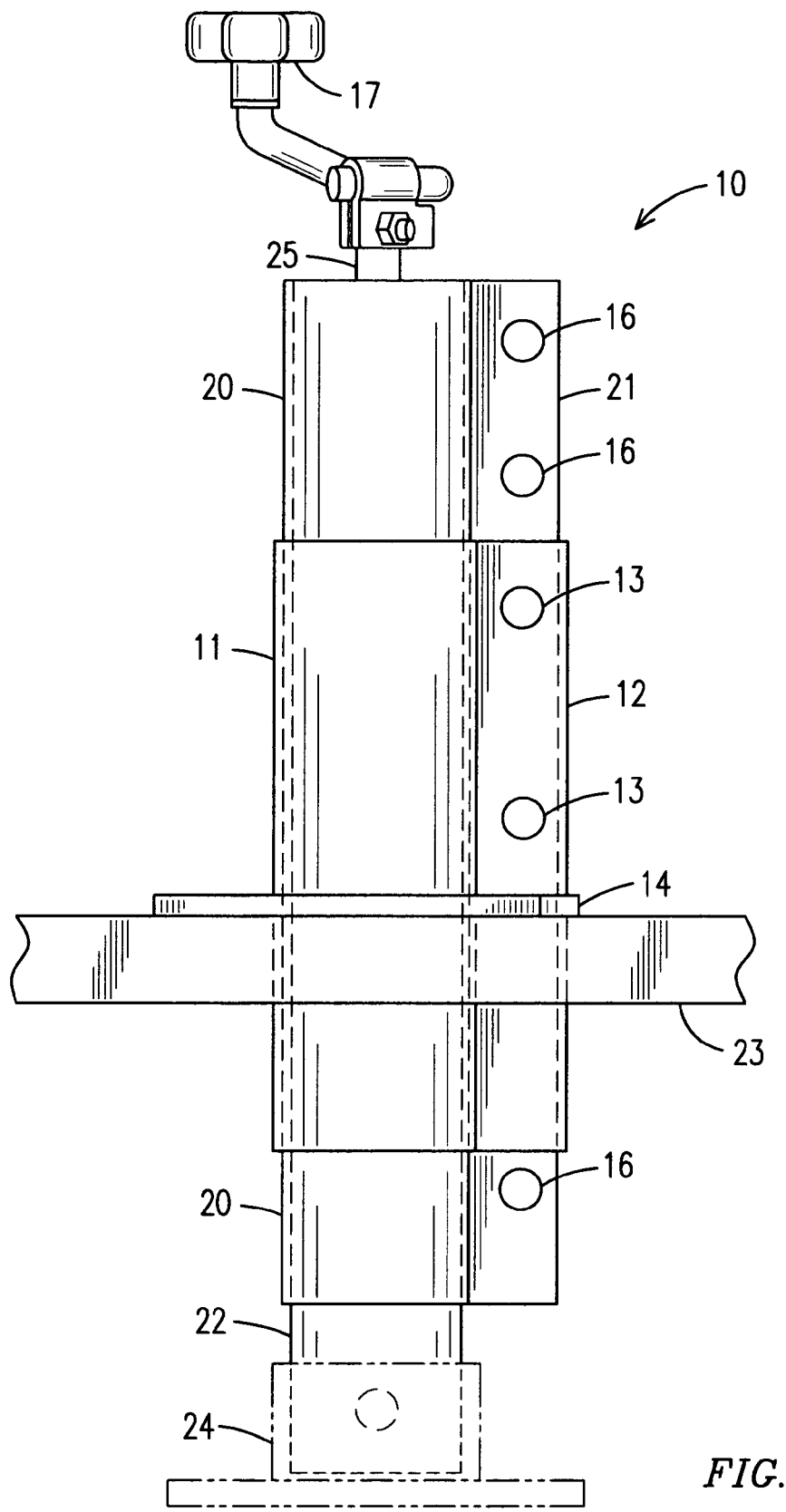
FIG. 4 shows a side view of a slidable, adjustable jacking device with a load-carrying member in a raised position, including a tubular outer member, a screwjack inner member, a load-carrying member, a hand-crank, and a foot; as the device would be situated on a trailer.

FIG. 4 is a side view of a slidable adjustable jacking device 10 shown resting on a flange 14 in a installed position on a trailer 23. A load-carrying member 22 is shown in a raised and retracted position. A foot 24 is shown on a bottom of a load-carrying member 22. If desired, a foot 24 may have a different embodiment such as a wheel. A screwjack inner member 20 and an affixed bar 21 are shown as located inside a tubular outer member 11 and an associated passageway 12. FIG. 4 also shows spaced bar holes 16 and complementary passageway holes 13. There are two sets of complementary passageway holes 13 in passageway 12. While one set of complimentary passageway holes 13 can be used as a placed to insert pin 18, the other set of complementary passageway holes may be used to accept a hasp of a lock passed through a passageway 12 with a bar 21 and prevent the theft of a bar 21 and an affixed screwjack inner member 20. FIG. 4 also identifies a jackscrew 25 which is connected to a hand crank 17. The screwjack inner member 20 and an affixed bar 21 may be slid out of the tubular outer member 11 and an associated passageway 12 and completely removed to prevent the theft of the screwjack inner member 20 and an affixed bar 21.

ADVANTAGES

The advantage of this present invention is that the operator of the adjustable slidable jacking device can quickly and easily slide a screwjack inner member 20 and an affixed bar 21 into a place where it is aligned with a complementary passageway holes 13 so that a pin 18 might be inserted to cause the relation between a bar 21 and a passageway 12 to remain fixed in relationship to a trailer 23. The operation of sliding a screwjack inner member 20 and an affixed bar 21, is the course adjustment in a jacking operation. Once a slidable adjustable jacking device 10 is coarsely adjusted, a hand crank 17 is rotated to extend a load-carrying member 22. The advantage of this device is that less rotations of a hand crank 17 are required than for jacking devices which do not have a slidable screwjack inner member 20 and an affixed bar 21.

Although the present invention has been described in considerable detail with reference to certain preferred versions thereof, other versions are possible. A tubular outer member 11 may be formed in a round shape or in a square or rectangular shape, according to the wishes of the manufacturer. A foot 24 may be a resting pad or a foot 24 may allow for motion, as a wheel would allow for motion. Therefore, the spirit and scope of the appended claims should not be limited to the description of the preferred version contained therein.

The reader's attention is directed to all papers and documents which are filed concurrently with this specification and which are open to public inspection with this specification, and the contents of all such papers and documents are incorporated herein by reference. All features disclosed in this specification (including any accompanying claims, abstract, and drawings) may be replaced by alternative features serving the same, equivalent or similar purpose, unless expressly stated otherwise. Unless expressly stated otherwise, each feature disclosed is one example only of a generic series of equivalent or similar features.

CONCLUSION, RAMIFICATIONS AND SCOPE

It can be seen by the description above the number of rotations of a hand crank on a jacking device may be greatly reduce by using a slidable screwjack inner member to re-position a load-carrying member.

While the above description contains much specificity, these should not be construed as limitations on the scope of any embodiment, but as exemplifications of the presently preferred embodiments thereof. Many other ramifications and variations are possible within the teachings of the various embodiments.

Thus the scope of the invention should be determined by the appended claims and their legal equivalents, and not by the examples given.

SEQUENCE LISTING

Not Applicable

I claim:

1. A slidable adjustable jacking device, comprising: a tubular outer member with a passageway affixed to a side of said tubular outer member, complementary passageway holes equally spaced longitudinally in said passageway, a screwjack inner member with a bar affixed to a side of said screwjack inner member, bar holes equally spaced longitudinally in said bar, a pin for inserting through said complementary passageway holes and said bar holes when said complementary passageway holes and said bar holes are registered for fixing a position of said screwjack inner member and said bar relative to a tongue of a trailer, a load-carrying member located within said screwjack inner member containing a jackscrew which retracts or extends upon rotation of a hand crank, a foot which is affixed to said load-carrying member which transfers force of a load from said tongue of said trailer to a resting location, a flange surrounding an outside of a combination of said tubular outer member and said passageway, and flange mounting openings for affixing said flange to said tongue of said trailer.

2. The adjustable slidable lacking device of claim 1 further comprising a means for adjusting a position of said screwjack inner member by sliding said screwjack inner member up or down while said screwjack inner member is located within said tubular outer sleeve when said pin is removed and affixing a position of said screwjack inner member relative to said trailer by inserting said pin through said complementary passageway holes and said bar hole.

3. The adjustable slidable jacking device of claim 1 wherein said flange mounting openings are located in corners of said flange.

4. The adjustable slidable jacking device of claim 1 wherein said flange is affixed to said tubular outer member and said passageway such that a portion of said tubular outer member and a portion of said passageway extend below said flange.

5. The slidable adjustable jacking device of claim 1 further comprising said pin being bent to an angle sufficient to prevent said pin from vibrating out of said complementary passageway holes and said bar hole.

6. The slidable adjustable jacking device of claim 1 further comprising said bar holes and said complementary passageway holes being aligned and configured to receive a cotter pin.

7. The slidable adjustable jacking device of claim 1 wherein said screwjack inner member and affixed said bar may be slid out of said tubular outer member and an associated said passageway and completely removed to prevent the theft of the said screwjack inner member and an affixed said bar.

8. The slidable adjustable jacking device of claim 1 wherein said load-carrying member may be retracted in an up position to protect said load-carrying member and said foot from being damaged.

* * * * *